July 21, 1942.  A. P. LEE  2,290,373
COOLING AND CONDENSATION OF VAPORS OF DISTILLED ORGANIC LIQUIDS
Filed Oct. 25, 1938
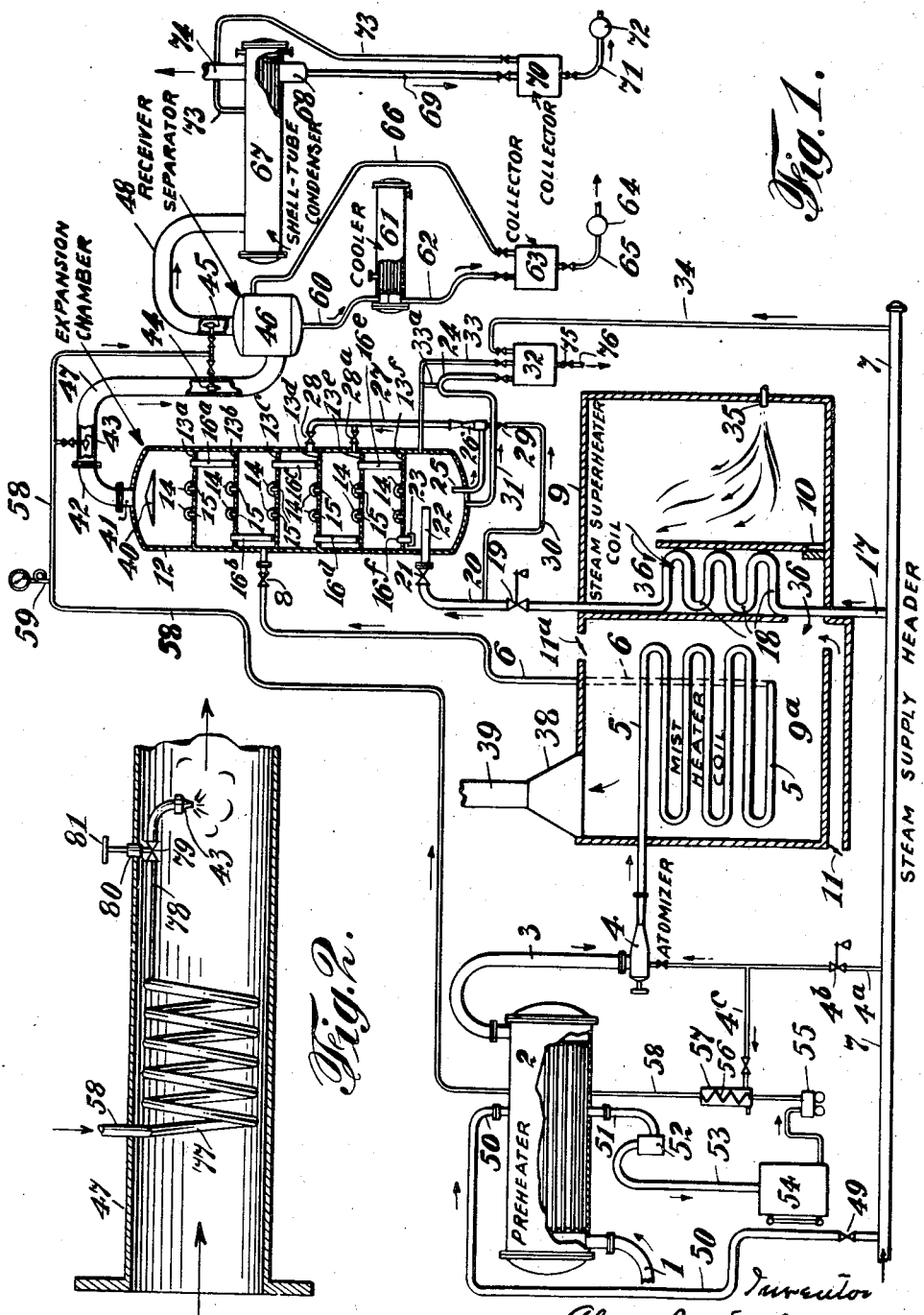

Patented July 21, 1942

2,290,373

UNITED STATES PATENT OFFICE 2,290,373

COOLING AND CONDENSATION OF VAPORS OF DISTILLED ORGANIC LIQUIDS

Alan Porter Lee, Madison, N. J.

Application October 25, 1938, Serial No. 236,852

9 Claims. (Cl. 202—69)

This invention relates to improvements in methods of cooling and condensing the vapors of distilled organic liquids. Examples are the distillate vapors of organic acids, particularly fatty acids—the products of hydrolysis of tallows, greases, fatty oils, soapstocks and similar products; petroleum derivatives of various boiling points; glycerine; benzene and liquid derivatives thereof; organic esters, aldehydes, ketones and the like.

It is an object of this invention to provide, for use in connection with the distillation of such products, a method of vapor cooling and condensation which will be more economical in consumption of liquid condensing medium, such as water, than previously employed vapor cooling or condensing methods.

Another object of the invention is to provide a method of condensation which will yield condensates free of contamination by the liquid cooling medium, while retaining the advantage of more economical consumption of cooling medium above referred to.

A further object of my invention is to provide, in cooling or condensation of the vapors of distilled organic liquids, a method of quickly utilizing the entire inherent capacity for absorption of latent heat of vaporization of the liquid cooling medium.

This application is a continuation in part of my Letters Patent of the United States on "Distillation and purification of carbonizable organic materials," Number 2,177,664, issued October 31, 1939.

The above-mentioned objects and other objects of this invention will be fully understood from the following description taken in conjunction with the accompanying drawing, which diagrammatically shows preferred embodiments of my invention. It is to be understood that the example herein described is by way of illustration only and not of limitation and that it may be applied to all other embodiments within the scope of this invention, as will be hereinafter fully disclosed.

The example given describes the operation of my invention in conjunction with the process of vacuum distillation of mixed fatty acids, but it is to be understood that my invention is applicable to cooling and condensation of the vapors of many other distilled organic liquids and is not limited to the cooling and condensation of fatty acid vapors.

Well known methods of cooling and condensing the vapors of distilled liquids include withdrawal of sensible heat and of latent heat from such vapors by any one of several means, singly or in various combinations. The most extensively used method is that which involves transfer of heat from the vapors to a liquid, such as water, which is of lower temperature than the said vapors, while preventing admixture with said liquid of the vapors or of the condensate thereof, by interposition of a suitable separating device, such as a metal tube or shell, between the vapors and the heat-absorbing liquid. Another well known method of condensing or cooling vapors of distilled liquids embodies passing said vapors through a structure of suitable dimensions and material, the outer surfaces of which structure are in contact with atmospheric air or other gas or vapor, which air or gas or air or other gas or vapor, which air or gas or vapor is of lower temperature than that of the vapors to be condensed or cooled. Increased velocity of motion of such air or gas or vapor over the said outer surfaces of the structure enclosing the vapors to be cooled or condensed reacts to accelerate the transfer of heat from the vapors within said structure to the exterior cooling medium.

Still another method of cooling or condensing the vapors of distilled liquids embodies forcing a stream or spray of cooling liquid, such as water, directly into the stream of distilled vapors, where the liquid absorbs heat from the vapors by direct contact. This method of cooling or condensing vapors is most readily applicable where the cooling liquid, in the liquid phase, is insoluble in, or immiscible with the distillate vapors or the condensate thereof.

Those who are skilled in the arts of distillation will recognize that all of the methods above described are applicable for cooling the vapors of distilled organic liquids for any one of several purposes, such as, for example, condensation and collection of distilled product, condensation and refluxing to the still of a portion of the distillate vapors, or cooling of the vapor stream to reduce its velocity, thus promoting the release of mechanically entrained unvaporized material and at the same time regulating the rate of distillation, with or without condensing and refluxing to the still a portion of the distillate vapors.

This invention relates particularly to improvements in the method which involves forcing a stream or spray of cooling liquid, such as water, directly into the stream of vapors.

In application of this well known cooling and condensing method in a process for continuous vacuum steam distillation of mixed fatty acids, in which application ordinary relatively cold pure water was used as the liquid cooling medium, it was found that the condensed distillate recovered in the condensate-separating device was small in quantity and contained appreciable amounts of free liquid water as well as some emulsified water.

In my invention, surprisingly, I entirely overcome these objections to the prior practice by heating the water used as the condensing medium nearly to its boiling point under positive pressure before releasing it into the reduced-pressure zone where the distillate vapors are cooled and condensed. When this preheated water is so released into the reduced-pressure condensing zone and all of the water is completely vaporized therein, the result is absorption from the mixed distillate and steam vapors within said condensing zone of the heat necessary for vaporization of the water. This absorption of heat causes the bulk of the distillate vapors to condense as liquid, entirely free of any liquid water.

The accompanying drawing is presented in illustration of equipment assemblies suitable for use in application of my invention to the cooling and condensation of the vapors of distilled organic liquids, such as, for example, distilled fatty acids, but are not intended to be construed as in any way limiting the process claims appended hereto to execution by means of the particular equipment illustrated specifically in said drawing.

In order that my invention may be clearly understood, I refer to the drawing herewith in which:

Figure 1 is an elevation, partly in section, of suitable apparatus for carrying out the invention, in one form of design.

Figure 2 is a detail of a particular form of preheating and spraying equipment for use in application of my invention.

Referring to Figure 1, which, as stated above, is an elevation, partly in section, of suitable equipment for carrying out of my process, pipeline 1 is the charging line through which the mixture of fatty acids or fatty-acid-containing stock is fed to the apparatus by gravity or by other suitable means. In the usual operation of commercial fatty acid distillation the stock fed may contain from 90% to 98% of mixed fatty acids, the remainder consisting of neutral fat, unsaponifiable material and traces of moisture. The material fed into the system through charging line 1 may be at any suitable temperature for its pipeline flow, varying from room temperature for liquid fatty acids to 150°–175° F. for higher melting mixtures. The stock to be distilled is fed thus through pipeline 1 into and through the shell-and-tube heat exchanger 2, where it is heated by means of any suitable hot fluid, preferably steam, to any convenient temperature of initial heat or preheat, such as 225° to 300° F., and preferably not over 275° F., for avoidance of local overheating and consequent decomposition. The temperature of the heating fluid may be from 300° to 375° F. or lower, but not substantially higher.

From the preheater 2 the stock to be distilled passes through the pipeline 3 to the atomizer 4, where it is thoroughly mixed, atomized and sprayed with from five to fifty or more times its own volume of steam. The effect of this atomization is to break up the solid stream of flowing liquid into a mist or spray of dissociated liquid particles of droplets, each being fully surrounded and encased by a protective atmosphere of steam. In this mixture the steam forms a continuous phase and the stock a discontinuous phase consisting of a plurality of separate particles. The possibility of formation of any film of liquid on the interior surfaces of the tubes 5, 5 in the heater 5, through which the mixture next passes is thus avoided. In this manner any local overheating, decomposition, charring or carbonization, is prevented. The atomization with steam also increases the velocity of flow and the turbulence of the atomized mist, thus contributing further to the avoidance of film formation in the tubes of the heater.

The atomization of the stock with steam may be accomplished by any suitable means, such as a steam ejector, revolving vanes, spray nozzles, mixing valve, burner-type atomizer or any suitable combination of such means. In the process herein described the atomizing means consists of a steam-ejector-type mixing valve.

For the steam used for atomization, any inert gas, such as nitrogen, might be substituted, in which case the atomizing gas would preferably be preheated to a temperature equal to or slightly higher than that of the stock to be atomized. When steam is used it may be saturated or slightly superheated steam.

The atomized mixture of stock and steam passes through the heating tubes 5, 5 of the mist heater coil, being heated therein by direct contact on the outer walls of the tubes of the gases of combustion of suitable fuel, as for example, natural gas, fuel oil or coal. In one application of my invention, waste gases which have previously been utilized for superheating steam are employed to heat the mixture of steam and fatty acids passing through the tubes 5, 5, means being provided to control the temperature of the gases when contacting the tubes 5, 5, raising this temperature by admission through bypass 10 (shown in closed position) of some gases not previously utilized and lowering it by admission of air through the tempering damper or dampers, 11 and 11a. Suitable temperature of gases entering the stock-steam heater pass 9a has been found to be between 650° and 950° F., preferably 850° F.

The atomized mixture of steam and stock is heated very rapidly while passing through the tubes 5, 5 of the pass 9a, a convenient rate being about 800° F. per minute, the heating being carried to a point below the vaporization temperature of the stock under the pressure conditions of the heater, but considerably above the vaporization temperature of the same stock under the subatmospheric pressure conditions which it next encounters in the distillation or flashing chamber 12. Suitable maximum temperatures for the atomized stock and steam mixture when distilling fatty acids are from 400° to 600° F. and preferably 475° to 525° F., although depending in some measure upon the composition of the stock and the absolute pressure conditions in the distilling apparatus. After being heated in the tubes 5, 5, where the pressure is maintained at an average of 8 lbs. per square inch gauge or less, the mixture of stock and steam passes through the pipe 6 and the control valve 8 into the distillation chamber 12, which is maintained under relatively low subatmospheric pressure, from 1″ to 10″ mercury absolute, and preferably about 2″ absolute in its upper portion, although the operation may be performed at other pressures, depending upon the amount of distillation steam employed. The distillation chamber may take any well-known form, as, for example, a plain cylinder, a tower packed with material for increasing evaporative surface, a screen-baffle tower or a bubble-cap tray tower. In this instance the chamber is shown as a bubble-cap plate tower 12, having several plates 13, 13, each plate being equipped with a plurality of bubble-caps 14, 14 and vapor chimneys 15, 15. Each plate is equipped also with an overflow pipe 16.

When the atomized mixture of steam and stock enters the vacuum chamber 12 through the valve 8, the steam expands, and the stock, being above its volatilization temperature for the pressure conditions of the vacuum chamber, commences to volatilize rapidly. Both of these conditions cause considerable drop in temperature in the stock, which drop amounts in practice to 40° to 90° F.

In the instance shown the stock and steam mixture is introduced just above the lowest upper tray 13c of the bubble tower. The steam and the immediately vaporized fatty acids rise in the tower toward the next tray above, while that part of the stock which remains unvaporized falls toward the tray 13c. The mixed vapors pass through the chimneys and caps in the next upper tray 13b and much of the vaporized fatty acids is condensed, forming on the tray a pool of fatty acids of considerably purer quality than the original stock. The depth of this pool is controlled by the overflow pipe 16b, which carries to the next lower tray all condensation in excess of the amount necessary to maintain a shallow pool on the upper tray 13b. The unvaporized stock likewise forms a pool on the first tray 13c below the feed inlet.

Steam at boiler pressure, in this case 145 lbs. per square inch gauge (temperature 363° F.) is taken from the steam header 7 through the pipe 17 and superheated in the pipe coil 18 in furnace 9 to final temperature of 900° to 1000° F. In passing through the pressure reducing and regulating valve 19, its pressure is reduced to 3–10 lbs. per square inch gauge and its temperature falls to 750°–900° F., normally 850° F. Any suitable fuel is burned at the burner 35 in furnace 9, the gases of combustion passing over the steam superheating coil 18 in space 36, then through pass 9a over the heating tubes 5, 5 through which latter tubes is passed the atomized stock-steam mixture which is to be distilled, the gases passing finally out through the breeching 38 and the stack 39. Control of temperature of the gases passing over the tubes 5, 5 is secured by means of the hot-gas bypass damper 10 and the tempering dampers 11 and 11a.

The reduced-pressure superheated steam is conducted through pipe 20, control valve 21 and nozzle 22 to the center of the tower 12 at a point just below the bottom bubble-cap plate 13f. This superheated steam serves two purposes, first, to aid distillation of the fatty acids and second, to supply heat to replace that consumed in evaporation of the stock and in radiation from the apparatus.

As the steam expands through the control valve 21 out of the supply pipe zone of pressure of 3 to 10 lbs. per square inch gauge, into the bottom area of the tower at pressure of 2½" to 3" of mercury absolute, there is marked cooling of the steam due to expansion, which enables regulation of the temperature of this bottom area at between 575° and 650° F., when using steam at temperatures between 800° and 900° F. before expansion into the tower.

When the pool of unvaporized stock on the tray 13c below the stock-steam inlet pipe becomes of depth just greater than the projection above the tray of the top of the overflow pipe 16c, the surplus stock overflows to the next lower tray 13d, where it forms a new pool of material lower in fatty acid content than the original stock. In similar manner pools are formed on each succeeding tray below the point where the atomized stock-steam mixture enters the tower.

As the superheated steam entering the bottom of the tower expands, rises through the bubble-cap chimneys and is distributed by the bubble-caps through the pool of material on the lowest tray, the bulk of the fatty acids remaining in this material will be vaporized, with the aid of the partial pressure of the superheated steam. The mixed steam and distillate vapors will rise through the chimneys of the next higher tray and be distributed through the pool of material on that tray. Here portions of the distillate vapors will condense, giving off their heat of condensation to cause evaporation (with the aid of the partial pressure of the steam) of further quantities of vaporizable material from the pool on that tray.

This process of condensation and evaporation is repeated on each succeeding bubble tray from bottom to top of the tower, the rising vapor mixture becoming progressively richer in distillate vapors as the top tray is approached and the descending unvaporized stock becoming progressively poorer in vaporizable material as it approaches the bottom tray.

The rising mixed vapors of the superheated steam and distillate become progressively cooler as they pass upward through the tower, from the effects of expansion, evaporation and radiation. The descending stream of liquid material likewise tends to become progressively cooler in descending through the tower, from the effects of evaporation and radiation. As the operation progresses, this tendency of the descending stock to become cooler is overcome, in part by the heating effect of partial condensation of distillate vapors in the pool of liquid on each tray and partly by the heat supplied by the superheated steam, so that when the operation reaches the desired state of continuous equilibrium, the descending liquid stock increases in temperature on each succeeding lower tray, while the ascending vapors decrease in temperature as they rise through the tower. The liquid residue flowing away from the bottom tray 13f, in fatty acid distillation is at a temperature of 505° to 595° F. and preferably 580° F. when distilling standard mixed fatty acids from tallow grease. It is to be noted that for best results, this temperature of material leaving the bottom tray may suitably be varied over a wide range, depending upon the type of material treated. For certain fatty acids of vegetable origin, this bottom tray temperature suitably may be carried as low as 400° F., or even lower.

The residue flows from the bottom plate through the overflow pipe 16f into the cup seal 23, out of which it falls to the bottom of the tower, forming there a pool, the depth of which is controlled by the inverted syphon pipe-loop 24.

In my invention I utilize a lift-pump operated by superheated steam at a temperature considerably above that of the residues to draw such residues from the bottom of the vacuum chamber 12 through the skimming pipe 25 and the lift-pump 26, discharging through the discharge pipe 27 and the valve 28 into the distillation chamber at a point above the third tray from bottom, 13d, or alternatively to the next lower tray 13e through the valve 28a, or through both of these valves to both of the trays simultaneously. Super-heated steam at 3 to 10 lbs. gauge pressure and temperature of about 850° F. is taken from the pipeline 20 through the valve 29 and the pipe 30 for operation of the lift-pump 26.

The heavier residues, sinking to the lowest point of the pool formed on the tower bottom and comprising all surplus which is not recycled by the lift-pump 26, flow through the pipe 31 and inverted syphon 24 into the pitch receiver 32, which is connected to the tower 12 by the vacuum-vent pipes 33 and 33a. The pitch receiver is shut off intermittently from the vacuum tower and, by means of steam pressure through the line 34 from the header 7, the pitch is discharged from the receiver 32 to storage, through valve 75 and pipe 76. When the pitch receiver is being discharged, the residues are permitted to accumulate further in the bottom of the tower 12, to the extent of surplus above the amount being recirculated, without deleterious effect upon the color of the distillate. In fact, after the continuous operation of the distilling apparatus has become stabilized, a pool of residue is maintained on the bottom of the tower 12, to the depth permitted by the height of the inverted syphon loop 24. This pool is heated by the superheated steam issuing from the nozzle 22 just above the pool and is also heated by the metal of the tower bottom, which in turn, derives its heat from the superheated steam. In operation the temperature of the residue pool is maintained at from 15° to 50° above that of the partially finished stock on the bottom tray 13f.

The vapors of pure fatty acids or other distilled material, which are volatilized from the upper tray, 13a, of the flashing chamber, by heat from the condensation of less pure vapors in the pool of liquid on that tray, and which are mixed with vapors of superheated steam, may be freed of entrained liquid by any well-known means (such as the baffle-plate 40 in this instance), and then pass to the condensing apparatus.

In the example herein described of the operation of my invention (Figure 1) the pure distillate vapors mixed with superheated steam rise from the top tray 13a of the distillation chamber 12. The mixed vapors travel through the annular space surrounding the entrainment baffle 40, pass above the baffle and out of the distillation chamber through the vapor nozzle 41 and the elbow 42. Exit vapor temperature for fatty acids may be 375° to 475° F. (preferably 415° to 430° F. for the mixed fatty acids of tallow greases).

Steam at 145 lbs. gauge pressure is taken from the main steam header 7 through the valve 49 and the pipeline 50 to the steam space of the preheater 2 where it is utilized to preheat the charging stock of the still by means of heat-exchange. The steam condenses in the preheater and the pure condensate water is automatically removed through the pipeline 51 by the steam trap 52, discharging through the pipeline 53 into the reservoir 54. Additional water, preferably pure condensed water free of impurities, may be added to the reservoir 54 as required, from any additional convenient source (not shown) of such water.

The pure condensed water from the reservoir 54 is pumped by the pump 55 through the heating coil 56 in the heat exchanger 57 and on through the pipeline 58 to the spray nozzles at 43, 44 and 45. These nozzles may be utilized in any suitable manner, each being controlled by a throttling or pressure-relieving valve. Steam, water or any suitable fluid may be used as the heating medium for the pure water passing through the coil 56. In the example shown, steam at 145 lbs. gauge pressure is taken from the steam main 7 through the pipeline 4a and reduced to 15 to 20 lbs. gauge pressure by means of the pressure-reducing and regulating valve 4b. A portion of this steam is utilized for atomization of the charging stock in the steam-atomizer 4 and another portion passes to the heat exchanger 57 through the pipeline 4c. In the heat exchanger 57, this steam is used to heat the water passing through the coil 56. This water is heated to 180° to 205° F. and preferably as high as possible without substantial vaporization in the coil 56 or the pipeline 58. Operation of the pump 55 is so controlled that a pressure of from 6 to 12 lbs., normally 8 lbs. gauge is maintained in the spray water supply pipe 58 at the gauge point 59 close to the spray-nozzle locations.

The means herein described for supplying hot water to the spray nozzles is one example only and its description is not to be construed as limiting my invention, as any suitable means for supplying the heated liquid and any suitable means of heating said liquid may be employed, my invention being comprised in the heating of a suitable vaporizable liquid such as water for use in direct contact spray condensation or vapor cooling to insure full absorption of the latent heat of vaporization of said liquid when it is discharged through the spray-nozzle or other spray device into the condensing or cooling zone. The sensible heat which is added to the water in its preheating is so small in proportion to the latent heat which is absorbed when the water is vaporized that it is not an important factor.

An alternative applicable method of heating the cooling liquid is shown in Figure 2 of the drawing, which is an enlarged vertical cross-section of a portion of the pipe 47 of Figure 1, with apparatus applied for this alternative method of heating the cooling liquid. In this modification of my invention the cooling liquid is preheated under super-atmospheric pressure by means of heat exchange through a pipe-coil with the vapors issuing from the still. It is important that the liquid be maintained at super-atmospheric pressure in the supply pipe and in the heat exchange coil, to avoid premature vaporization and means are provided to secure this pressure maintenance.

Referring to the drawing (Figure 2) 47 is a vertical cross-section view of a portion of the vapor pipe through which the vapors issue from the still. 58 represents the cooling liquid supply pipe through which the cooling liquid, under super-atmospheric pressure, enters the preheating coil 77, which is disposed securely within the vapor pipe 47 and in which the cooling liquid is preheated nearly to its boiling point at the pressure of heating, by means of heat exchange with the distillate vapors surrounding the coil 77 in the pipe 47. From the preheating coil 77, the preheated cooling liquid flows through the pipe 78 and is released through the throttling or pressure-relieving valve 79 and the spray nozzle 43 into the reduced-pressure zone of the vapor pipe 47, where the preheated liquid vaporizes readily, absorbing its latent heat of vaporization from the stream of vapors within said vapor pipe 47.

The throttling or pressure-relieving valve 79 is located in the liquid pipe 78 within the vapor pipe 47 and serves to control the outflow of the preheated cooling liquid through the spray-nozzle 43 and to maintain the liquid in the supply pipe 58 under the super-atmospheric pressure generated by the liquid supply pump 55 (Figure 1). The stem of the throttling valve 79 passes through the stuffing-box 80 in the wall of pipe 47 to the exterior valve handle 81.

If cold, or only moderately warm water is used for spray condensation purposes in vacuum apparatus, the water will be vaporized eventually, provided the apparatus is of sufficient size to allow extended length of vapor travel between the point of water spray injection and the vacuum-producing equipment, but an advantage of using water or other vaporizable liquid which has been preheated to a temperature closely approaching its vaporization point under a positive pressure condition of heating is to be found in the rapidity with which such preheated liquid will be vaporized under the reduced-pressure condition existing in the vacuum apparatus.

It will be obvious to those skilled in the distillation arts that the water or other liquid selected as a spray condensation medium must have a vaporization temperature point well below that of the distillate to be condensed and must have a relatively large latent heat of vaporization capacity. It is evident therefore that the choice of condensing liquid employed is dependent upon the properties of said liquid in relation to those of the distillate vapors. Among such condensing liquids which can be employed in my invention are the following:

| Liquid | Boiling point | Latent heat of vaporization B. t. u. per lb. |
|---|---|---|
|  | °F. |  |
| Methanol | 148 | 480 |
| Ethanol | 174 | 370 |
| Acetone | 133 | 224 |
| Benzene | 175 | 167 |
| Toluene | 230 | 156 |
| Normal pentane | 97 | 154 |

By the terms "vaporizable liquid, such as water" as employed in this specification and in the claims appended hereto, I mean condensation liquids having, in each case, a vaporization point well below that of the distillate to be condensed and having a relatively large latent heat of vaporization capacity.

The practical advantages resulting from rapid and complete vaporization of the cooling medium are threefold: first, reduction in necessary size of efficient apparatus; second, complete availability of the latent heat of vaporization capacity of the liquid for cooling and condensing purposes, resulting in use of minimal quantities of cooling liquid; third, complete freedom of the condensate from traces of the cooling liquid.

The spray condensing system may be combined with any suitable collecting system for recovery of the condensed distillate. In the example shown, (Figure 1) the mixed vapors of steam and distillate entering the outlet pipe 41 at 415° to 430° F., are cooled to 325° to 365° (normally 350° F.) by means of the hot-water sprays 43, 44 and 45. Passing through the vapor pipe 47 into the receiver-separator 46, the bulk of the distillate vapors separates out as liquid fatty acids in the receiver-separator, from which the liquid condensate flows by gravity through the pipeline 60, the shell-and-tube cooler 61 and the pipe 62 to the collector 63. In passing through the shell-and-tube cooler 61, the liquid condensate is cooled to 125° to 175° (normally 135° F.) by means of water or other cooling fluid and collected in a pure moisture-free state in the collector 63. From this container it may be pumped continuously by means of the pump 64 and the pipe 65 to a receiving and storage tank (not shown). The collector 63 is joined to the receiver-separator 46 by the additional vacuum-vent pipe 66.

After collection of the bulk of the condensed distillate in the receiver-separator 46, the residual water vapors, containing a small percentage of uncondensed distillate vapors, pass through the vapor pipe 48 to the shell-and-tube condenser 67, where the vapor stream is further cooled to 115° to 140° F. (normally 120° F.), by heat exchange with water or other suitable cooling fluid. Here the remaining distillate vapors are condensed, the liquid condensate collecting in the hot-well receiver 68 and flowing by gravity through the pipe 69 to the second collector 70, from which this condensate is pumped continuously through the pipe 71 by means of the pump 72 to a receiving and storage tank (not shown). The second collector 70 is connected to the shell-and-tube condenser 67 by a vacuum-vent pipe 73 in addition to the pipe 69. The distillate condensed in the shell-and-tube condenser and collected in the second collector 70 generally contains small quantities of liquid water, but the total of this condensate is a very small fraction of the total from the still, the bulk of the distillate vapors being condensed by the spray condensing system.

The final water vapor, practically free of distillate, (vapor or liquid) leaves the shell-and-tube condenser 67 by the vapor pipe 74, passing to standard vacuum apparatus of any suitable type (not shown).

As an example of operation under the process hereinbefore described, the following distillation has been carried out. The distilling bubble tray column utilized was approximately 15' high and 6' 6" in internal diameter at the top, (cross-sectional area 33.2 square feet). The tower contained six bubble trays spaced 22" apart, the bottom tray being 30" above the bottom of the tower. The upper tray contained 84 bubble caps, each cap being 5" in external diameter. The total effective distilling area of the upper plate was therefore 21.75 square feet. The top vapor outlet of the tower was 16" internal diameter. Below the vapor outlet a conical shaped baffle plate 41" in greatest diameter was inserted. The annular space through which all vapors passed between this baffle plate and the upper portion of the tower wall was 28.25 square feet in area.

Steam was admitted to the tower through a 3" pipe below the bottom tray, but above the maximum height of the pool of residue on the bottom of the tower. The material to be distilled, after atomization by steam, was admitted to the heater through two two-inch tubes in parallel and after leaving the heating zone the two portions were combined in one three-inch pipe through which the mist of atomized fatty acids and steam entered the distilling tower in its upper portion. Pressure slightly in excess of atmospheric was maintained in the tubes of the heater.

During a continuous run of 91½ hours, 180,900 pounds of Twitchellized brown grease fatty acids containing 96.2% of free fatty acids, (calculated as oleic acid) were fed to the still, or at an average rate of 1977 pounds per hour. 173,390 pounds of distillate were recovered, having color of between 1 and 1½ A. S. T. M., representing a yield of 95.8%. (A. S. T. M. refers to the color standards of the American Society for Testing Materials, which are well known to those skilled in the art of distillation.)

During this period 3202 lbs. of steam were fed to the charge through the atomizing device, an average of 35 lbs. per hour.

There was added also a total of 86,790 lbs. of superheated steam, (an average of 948.5 lbs. per hour) through the three-inch pipe at the bottom of the tower and through the bottoms recirculating lift-pump. The stream of fatty acids entered the steam preheater at about 160° F. and was heated therein to temperature of 215° to 230° F. with normal temperature of 225° F. It then passed to the atomizing and steam-mixing valve wherein it was atomized and thoroughly mixed with an average of 35 lbs. of steam per 1977 lbs. of charge, or approximately 29 parts of steam by volume to each part of fatty acid charge.

This atomized mixture of fatty acids and steam entered the mist-heater tubes 5, 5 at a temperature of 227° F. and was heated therein to 495° to 530° F. with a normal temperature of 510° F. Passing then to the distilling column through the line 6 and the valve 8, the atomized mixture entered the column above the tray 13c and was cooled by expansion and evaporation so that the temperature of the liquid pool formed on the tray 13c was 425° to 440° F., normally 430° F.

A large portion of the fatty acids was vaporized at once and passed upward as vapor through the distilling column. The unvaporized portion formed a pool on the tray 13c and overflowed therefrom to the lower trays in succession. As the unvaporized residue of the stock descended through the tower, successive additional portions of the fatty acids were vaporized from each tray and the temperature of the residue gradually rose until on the bottom tray (13f) the temperature was 525° to 550° F. with normal temperature of 525° F. From this tray the remaining unvaporized residue overflowed into the cup 23 and thence to the bottom of the tower. When the pool of residue so formed in the bottom of the tower reached the height of the intake of pipe 25, 4 inches above the bottom of the tower, the lift-pump 26 commenced drawing the residue through the pipe 25, mixing it with superheated steam to reheat it and discharging it above the plate 13d where it joined the stream of unvaporized stock descending through the distilling column. When the total of unvaporized stock descending in the tower became greater than the amount returned by the lift-pump to plate 13d, a pool was formed in the bottom of the tower. The depth of this pool was controlled (by the outlet pipe loop 24) at 13 inches above the bottom of the tower. When the pool started to exceed this depth, all surplus unvaporized residue flowed from the bottom of the pool through the pipe loop 24 into the pitch receiver 32, whence it was discharged intermittently to a storage tank (not shown) by means of steam pressure admitted to the receiver 32 from the pipeline 34.

By means of the superheated steam entering the distilling column and in the lift-pump 26, the temperature of the recycling stock and of the descending stock in the lower portion of the column was gradually raised until the temperature on the bottom tray became 580° to 610° F., normally 595° F. and the temperature of the pool of residue in the bottom of the tower became 610° to 635° F., normally 615° F.

The vapors rising in the distilling column had an exit temperature of 410° to 430° F., normally 420° F. and were cooled immediately upon leaving the tower, so that the residual vapors leaving the receiver-separator 46 had a temperature of 340° to 367° F., normally 350° F. In the shell-and-tube condenser 67, the vapors were further cooled to an exit temperature of 115° to 140°, normally 125° F., and here substantially the entire remainder of the uncondensed fatty acid vapors was condensed, collecting in the hot-well 68 and flowing to the second collector 70. The condensed fatty acids flowing from the receiver-separator 46 were cooled in the shell-and-tube cooler 61 to 125° to 160° F., normally 135° F. This condensate was free of water. The condensates from both collectors were pumped to a single storage tank, where they were combined in anticipation of further processing or shipment.

During the period of operation 3,365 gallons of condensed water (an average of 36.8 gallons per hour) were pumped from the reservoir 54 by the pump 55 through the heat exchange coil 56, the line 58, and the throttle or pressure-relief valves to the spray-nozzles 43, 44 and 45. The temperature of the water used in the sprays was 198° to 200° F., normally 200° F. The pressure of this water in the supply pipe 58 near the spray-outlets was 3 to 8 lbs. per square inch, normally 6 lbs. per square inch, above atmospheric pressure.

The plant steam pressure utilized was 148 lbs. per square inch gauge with total temperature of 365° F. The superheated steam had pressure of 6.5 lbs. gauge and temperature of 850° F. before entering the bottom of the tower and the lift-pump, variations of pressure being observed between 5 lbs. and 7 lbs. gauge and temperature range from 830° to 880° F. The pressure of steam before entering the atomizing mixer was 18 lbs. gauge, temperature 255° F.

Absolute pressures maintained in the system were as follows:

|  | Mercury |
|---|---|
| At the vacuum condenser | 0.5″ |
| At the shell-and-tube condenser | 1.0″ −1.5″ |
| At the receiver-separator | 1.5″ −2.0″ |
| At the tower top | 1.75″−2.25″ |
| At the tower bottom | 2.5″ −3.0″ |

The yield was as follows:

|  | Pounds | Per cent |
|---|---|---|
| Distillate | 173,390 | 95.8 |
| Pitch | 6,645 | 3.7 |
| Loss | 865 | 0.5 |

This invention may be used likewise in other distillation coolings and condensations where it is desired to reduce the quantity of cooling liquid, such as water, consumed, also where it is desired to recover the condensate free of traces of the cooling liquid. It may be used also in connection with the deodorization and/or purification of fatty oils or mineral oils, or other organic substances containing volatile components. The fatty acids mentioned in the foregoing can be substituted, for instance, by petroleum oils, particularly lubricant stocks or other high-boiling fractions of petroleum, without any change of procedure other than those which would be evident from a knowledge of the chemical and physical properties of those materials.

The foregoing detailed description has been given only for clarity of understanding and no unnecessary limitations should be understood therefrom, but the appended claims should be construed as broadly as permissible, in view of the prior art.

What I claim is:

1. The process of vacuum distillation of organic liquids which comprises distilling the organic liquid and passing the vapors of distillation into and through a condensing zone of subatmospheric pressure wherein said vapors are brought into intimate and direct contact with a suitable preheated vaporizable liquid condensing medium, such as water which liquid condensing medium is insoluble in said vapors or in their liquid condensate and has a vaporization temperature, under the pressure condition existing in said condensing zone, lower than the condensing temperature of the distillate vapors to be condensed and which vaporizable liquid condensing medium has been preheated under superatmospheric pressure nearly to, but below its vaporization temperature at the pressure condition of said preheating step, condensing the vapors of the distilled organic liquid by absorption from said distillate vapors within the said condensing zone of the latent heat of vaporization of said preheated vaporizable liquid condensing medium, collecting the condensed organic liquid substantially free of admixture with said condensing medium and removing said condensing medium in the form of vapor from said condensing zone.

2. The process of vacuum distillation of fatty acids which comprises distilling the fatty acid or mixed fatty acids and passing the vapors of distillation into and through a condensing zone of subatmospheric pressure wherein said vapors are brought into intimate and direct contact with a suitable preheated vaporizable liquid condensing medium, such as water, which has a vaporization temperature, under the pressure condition existing in said condensing zone, lower than the condensing temperature of the fatty acid distillate vapors to be condensed and which vaporizable liquid condensing medium has been preheated under superatmospheric pressure nearly to, but below its vaporization temperature at the pressure condition of said preheating step, condensing the vapors of the distilled fatty acid or mixed fatty acids by absorption from said distillate vapors within the said condensing zone of the latent heat of vaporization of said preheated vaporizable liquid condensing medium, collecting the condensed fatty acid or mixed fatty acids substantially free of admixture with said condensing medium and removing said condensing medium in the form of vapor from said condensing zone.

3. The process as described in claim 2 in which said vaporizable liquid condensing medium, such as water, is preheated under superatmospheric pressure nearly to, but below its vaporization temperature at the pressure condition of said preheating step by means of indirect heat exchange with the said fatty acid distillate vapors to be condensed, before said vaporizable liquid condensing medium enters into direct contact with said fatty acid distillate vapors within said condensing zone.

4. In a process for distillation of organic liquids in which condensation of distillate vapors is performed by introduction into direct contact with said distillate vapors in a condensing zone of a vaporizable liquid condensing medium insoluble in said vapors or in their liquid condensate, the steps which comprise preheating the said vaporizable liquid condensing medium under greater pressure than the pressure existing in said condensing zone, nearly to, but below the vaporization temperature of said condensing medium at the pressure condition of said preheating, introducing said preheated vaporizable liquid condensing medium into direct contact with said distillate vapors in said condensing zone, condensing the vapors of said distilled organic liquid by absorption from said vapors within the said condensing zone of the latent heat of vaporization of said vaporizable liquid condensing medium, removing the liquid condensate substantially free of admixture with said condensing medium and removing said condensing medium in the form of vapor from said condensing zone.

5. In a process for distillation of organic liquids, the method of reducing velocity of the vapors of distillation and separating unvaporized liquid entrainment therefrom which comprises passing said vapors into direct and intimate contact in a cooling zone with a suitable vaporizable liquid cooling medium, such as water, which liquid cooling medium is insoluble in said vapors or in their liquid condensate and which has been preheated under greater pressure than the pressure existing in said cooling zone, nearly to, but below the vaporization temperature of said cooling medium at the pressure condition of said preheating step, cooling the vapors of distillation by absorption from said vapors of latent heat of vaporization of said preheated cooling medium, thereby reducing velocity of said vapors of distillation and separating therefrom unvaporized liquid entrainment which may be returned to the source of distillation or otherwise separately removed from said cooling zone and removing said cooling medium in the form of vapor from said cooling zone.

6. In a process for distillation of fatty acids, the method of reducing velocity of the vapors of distillation and separating unvaporized liquid entrainment therefrom which comprises passing said vapors into intimate and direct contact in a cooling zone with a suitable vaporizable liquid cooling medium, such as water, which has been preheated under greater pressure than the pressure existing in said cooling zone, nearly to, but below the vaporization temperatures of said cooling medium at the pressure condition of said preheated step, cooling the vapors of distillation by absorption from said vapors of latent heat of vaporization of said preheated cooling medium, thereby reducing velocity of said vapors of distillation and separating therefrom unvaporized liquid entrainment which may be returned to the source of distillation or otherwise separately removed from said cooling zone and removing said cooling medium in the form of vapor from said cooling zone.

7. The process method as described in claim 6 in which said vaporizable liquid cooling medium, such as water, is preheated nearly to, but below its vaporization temperature at the pressure condition of the preheating step by means of indirect heat exchange with the said vapors of distillation, before said vaporizable liquid cooling medium enters into direct contact with said vapors of distillation in said cooling zone.

8. The process of vacuum distillation of organic liquids which comprises distilling the organic liquid and passing the vapors of distillation into and through a condensing zone of subatmospheric pressure wherein said vapors are brought into intimate and direct contact with a suitable preheated vaporizable liquid condensing medium, such as water, which liquid condensing medium is insoluble in said vapors or in their liquid condensate and has a vaporization temperature, under the pressure condition existing in said condensing zone, lower than the condensing temperature of the distillate vapors to be condensed and which vaporizable liquid condensing medium has been preheated under superatmospheric pressure nearly to, but below its vaporization temperature at the pressure condition of said preheating step by means of indirect heat exchange with the said distillate vapors to be condensed before said vaporizable liquid condensing medium enters into direct contact with said distillate vapors within said condensing zone, condensing the vapors of distilled organic liquid by absorption from said distillate vapors within the said condensing zone of the latent heat of vaporization of said preheated vaporizable liquid condensing medium, collecting the condensed organic liquid substantially free of admixture with said condensing medium and removing said condensing medium in the form of vapor from said condensing zone.

9. In a process for distillation of organic liquids, the method of reducing the velocity of the vapors of distillation and separating unvaporized liquid entrainment therefrom which comprises passing said vapors into direct and intimate contact in a cooling zone with a suitable vaporizable liquid cooling medium, such as water, which liquid cooling medium is insoluble in said vapors or in their liquid condensate and which has been preheated under greater pressure than the pressure existing in said cooling zone, nearly to, but below its vaporization temperature at the pressure condition of the preheating step by means of indirect heat exchange with the said vapors of distillation, before said vaporizable liquid cooling medium enters into direct contact with said vapors of distillation in said cooling zone, cooling the vapors of distillation by absorption from said vapors of latent heat of vaporization of said preheated cooling medium, thereby reducing the velocity of said vapors of distillation and separating therefrom unvaporized liquid entrainment which may be returned to the source of distillation or otherwise separately removed from said cooling zone and removing said cooling medium in the form of vapor from said cooling zone.

ALAN PORTER LEE.